United States Patent [19]

Tsumura et al.

[11] Patent Number: 5,262,765
[45] Date of Patent: Nov. 16, 1993

[54] ANIMATION IMAGE COMPOSITION AND DISPLAY DEVICE

[75] Inventors: Mihoji Tsumura; Shinnosuke Taniguchi, both of Osaka, Japan

[73] Assignee: Ricos Co., Ltd., Osaka, Japan

[21] Appl. No.: 748,260

[22] Filed: Aug. 21, 1991

[30] Foreign Application Priority Data

Aug. 21, 1990 [JP] Japan .................. 2-220468

[51] Int. Cl.⁵ .............................. G09G 5/00
[52] U.S. Cl. ................................. 345/122
[58] Field of Search ............ 340/725, 815.11; 84/464 R, DIG. 6, DIG. 13; 381/48; 395/152

[56] References Cited

U.S. PATENT DOCUMENTS

| 4,305,131 | 12/1981 | Best | 340/725 |
| 4,569,026 | 2/1986 | Best | 340/725 |
| 5,048,390 | 9/1991 | Adachi et al. | 84/464 R |

FOREIGN PATENT DOCUMENTS 63-197212  8/1988  Japan .
1-226091   9/1989  Japan .

Primary Examiner—Jeffery Brier

[57] ABSTRACT

A device is for the display of still animation images in sequence on a display in time with the reproduction of music by a digital sound source driven by MIDI signals. The device reads a series of specified or optional animation images from an image database, which holds many animation images, and transmits them in accordance with tempo data which forms part of the MIDI data. The device also uses pitch data to determine the color of the animation images to be displayed. The device composes the still images and the specified colors and displays them on a visual display medium.

7 Claims, 2 Drawing Sheets

ANIMATION IMAGE COMPOSITION AND DISPLAY DEVICE

BACKGROUND OF THE INVENTION

1. Field of the Invention

It is assumed that the automatic performance of karaoke music is accomplished by using MIDI data to drive a digital sound source. The invention itself relates to a device for the display of animation images on a visual display medium by processing MIDI data during the performance of the music.

2. Description of the Prior Art

The configuration required for the automatic performance of karaoke music using a MIDI standard digital sound source is already known. The configuration for automatic performance in accordance with the MIDI standard requires only a minimal amount of data per piece of music compared with other systems such as PCM recording systems and as a result the required data can be conveniently stored on a memory dedium such as an optical disk. However, MIDI data can only be used as music data and is not used for the display of lyrics on a visual display medium. As a result the singer is obliged to go through the rather tedious process of reading from a separate book of lyrics while he is singing.

The inventor has already disclosed a number of technologies which resolve this problem through the incorporation into music data of lyric data in the form of character data which is then used for the display of lyrics on screen in time with the music (Japanese Patent Application No. H01-5793, No. H01-50788, etc.). Since this enables the lyrics to be displayed on screen in time with the music, it dispenses with the need for a book of lyrics. However, the mere display of lyrics on screen offers little to the singer in the way of either aural or visual enjoyment. This can easily lead to boredom amongst those awaiting their turn with the microphone.

It is, of course, possible to vary the background of the display against which the lyrics are being displayed but, since there is a need to keep the amount of data to a minimum, this is generally confined in practice to the variation of a single background color which is not very effective.

It is, of course, possible to think in terms of improving the visual effect by placing more emphasis on the image data, thereby giving equal treatment to the music data and the image data. Unfortunately, this would result in a sharp reduction in the advantages to be gained form configuring the data in accordance with the MIDI standard. The main disadvantages are: (1) The volume of required data would become much larger, thereby running contrary to the objective of the MIDI standard which is to provide high quality music using a minimal volume of data. (2) It would be necessary to create separate music data incorporating image data for each piece of music, thereby increasing the input cost. (3) A large capacity memory device or memory medium would be required. (4) In cases where the data size per unit was large, there would be a risk of impairing the performance of the music itself. (5) The time and cost of data transmission would be much greater. In other words, since the volume of data per unit is kept to a minimum when using music data based on the MIDI standard, it is desirable that the amount of image data should also be kept to a minimum.

SUMMARY OF THE INVENTION

It is the main object of the invention to provide a device for the composition and display of animation images along with lyrics on a karaoke visual display medium without detracting from the benefits of music data based on the MIDI standard.

It is another object of the invention to provide a device which will extract specified data from the music data itself and will use this as image data, thereby causing the selected animation images on the visual display medium to move without recourse to dynamic image data.

It is still another object of the invention to provide a configuration which will enable the selection of a means for selecting the type of animation image from any of a plurality of means.

The following description of the preferred embodiments should clarify, with the help of the drawings, such further objects, features and benefits of this invention as have not been included above.

DESCRIPTION OF THE PREFERRED EMBODIMENTS

Figure 1:
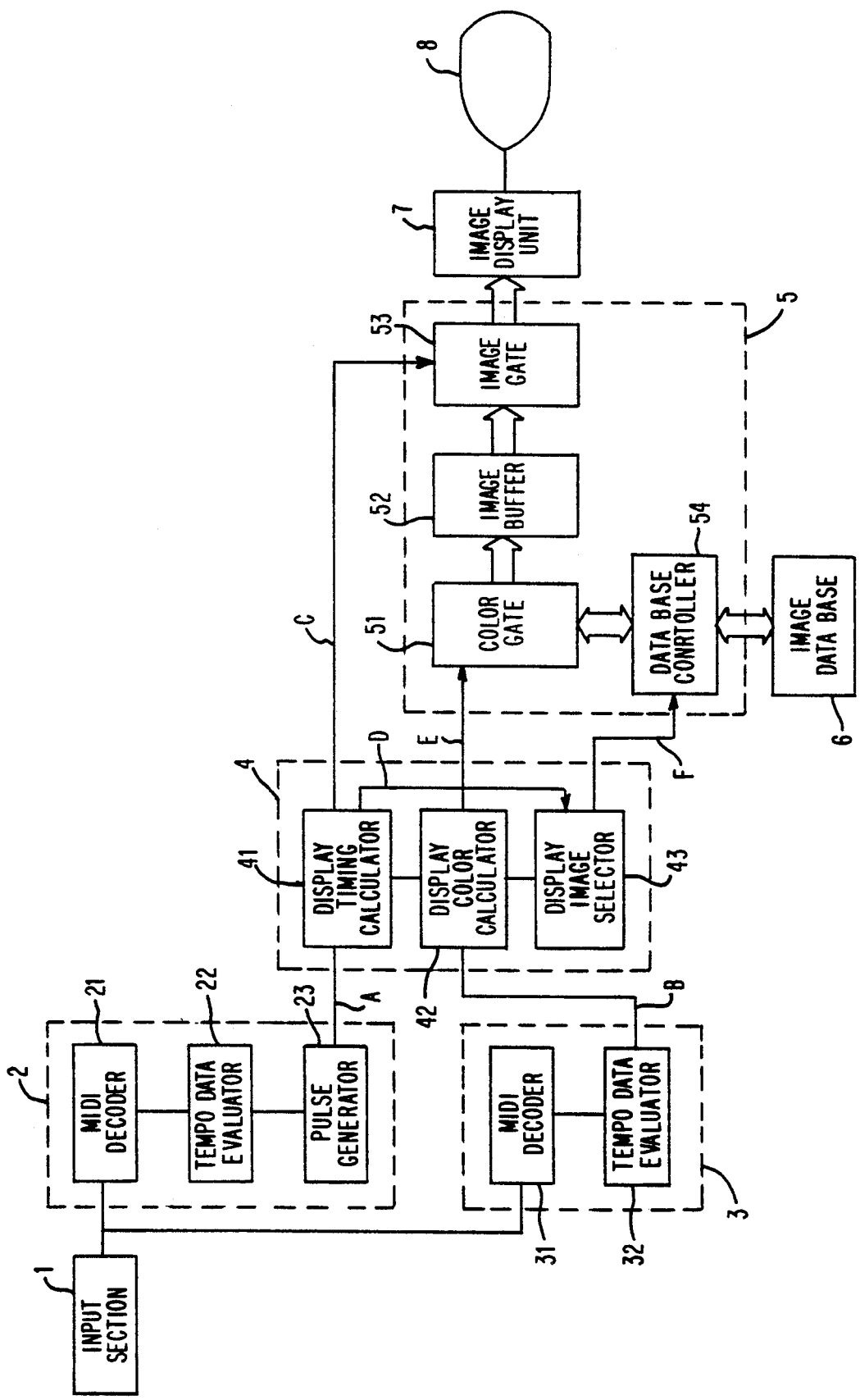
FIG. 1 is a block diagram illustrating the total configuration of one preferred embodiment of this invention.

There follows a description of the preferred embodiments of the invention by reference to the accompanying drawings. FIG. 1 illustrates the total configuration of the invention which processes MIDI data input to a digital sound source based on the MIDI standard and reads selected data from image data stored in a database which it then composes and displays on a visual display medium. MIDI data is data used to drive a digital sound source expressed as a series of binary codes. The MIDI data itself is configured from various data elements including tempo data which relates to the pace of musical reproduction, pitch data which relates to the pitch of the music, wave form data which relates to the tone of the music and effective sound data which relates to the overall musical effect. Of the above types of data, this invention uses the tempo data as animation image frame feed data and the pitch data as animation image color determination data. The animation images themselves each consist of a set of still images and are stored in an image database.

In other words, the above configuration enables the display of dynamic images on a visual display medium without the inclusion in the MIDI signals of any extra data in addition to the music data, thereby making it possible to keep the unit volume of the data to a minimum without in any way impairing the performance of the music itself. There is, furthermore, no increase in the time or cost of data transmission. Also, since image data does not have to be added to the music data, there is thus no need to think in terms of images during the initial creation of the music data. Moreover, since the music and the animation images are configured independently, the invention effectively constitutes a means for the free combination of these two individual elements.

Next, the preferred embodiment will be explained block by block in accordance with functional precedence. Broadly speaking the preferred embodiment is configured in terms of eight different blocks. To be more precise, it comprises an input section 1, a tempo detector 2, a pitch detector 3, an image composition controller 4, an image composer 5, an image database 6, an image display unit 7 and a visual display medium 8. Of these, the input section 1 inputs MIDI data to the subsequent blocks, said MIDI data having been branched in parallel from the MIDI data input to the sound source (omitted from the drawing). The tempo detector 2 extracts tempo data from the MIDI data after which it generates a pulse, which is synchronized with said tempo data, and outputs it to the image composition controller 4.

The pitch detector 3 extracts pitch data from the MIDI data and outputs parameters for the determination of the color to be displayed on the visual display medium 8 to the image composition controller 4. When said tempo data and pitch data are input to the image composition controller 4 it is, of course, necessary for it to be processed into an effective form of data by any of various means such as wave form conversion and level shift. On the basis of an image synchronization pulse received from the tempo detector 2 and display color data received from the pitch detector 3, the image composition controller 4 specifies the relevant addresses while at the same time issuing the appropriate instructions to the image composer 5 in the next block in respect of foreground color, background color and display timing. The image composition controller 4 also determines the appropriate sequence of animation images to be read out of the image database 6. The image composer 5 then reads the image related data determined by the image composition controller 4 out of the image database 6 and, after composing the animation image in accordance with the specified display and background colors, transmits it to the image display unit 7 in accordance with the display timing signal c. On receipt of the digital image signal, the image display unit 7 converts it to a video signal and displays it in the shape of a still animation image on a visual display medium 8 such as a monitor screen. The image database 6 makes use of a storage medium such as an optical disk to store a plurality of sets of animation images, each said set comprising a sequence of image patterns. The images determined by the image composer 5 can thus be read out of said database.

Next, there follows a more detailed explanation of the blocks inside the main blocks outlined above. The tempo detector 2, which constitutes the first block, is configured from a MIDI decoder 21, a tempo data evaluator 22 and a pulse generator 23. The MIDI decoder 21 converts the MIDI data received serially from the input section 1 into N bit data units which are then output to the tempo data evaluator 22. The tempo data evaluator 22 analyses the input MIDI data and either skips over it in cases where it finds no tempo data included or else triggers the pulse generator 23 in cases where it identifies tempo data. The pulse generator 23 then outputs an image synchronization pulse a to the image composition controller 4.

The pitch detector 3 is configured from a MIDI decoder 31 and a pitch data evaluator 32. The MIDI decoder 31 converts MIDI data into N bit data units. The pitch data evaluator 32 analyzes the converted data in sequence and wither ignores it in cases where it finds no pitch data included or else outputs it in unaltered form as pitch data b to the image composition controller 4 in the next main block in cases where it identifies pitch data. The image composition controller 4 into which the image synchronization pulse a and the pitch data b are input, comprises a display timing calculator 41, a display color calculator 42 and a display image selector 43. The display timing calculator 41 first processes the input image synchronization pulse a after which it controls the timing of the output of the image signal by outputting a one bit display timing trigger signal c to the image composer 5 in accordance with the tempo of the musical performance. At the same time, the display color calculator 42 processes the pitch data b and, after converting it to display color related data, outputs it to the image composer 5 in the next main block. In the case of display color processing, the determination of color may be carried out in accordance with specified rules or by random selection.

The display image selector is the part which determines the selection of one type of animation image from the plurality of animation image types stored in the image database 6. The selection of a specified animation image is accomplished by the output of a signal d to the display image selector 43 which is synchronized with the first of the series of display timing signals c which are output from the display timing calculator 41. A control signal f is then output to control the database. The adoption of this method eliminates the need for any additional types of data.

However, this is just one of many possible examples and any sort of configuration which enables the output of a trigger signal to activate the display image selector 43 would be equally acceptable. It would be possible, for example, to use the first pulse generated by the pulse generator 23 in the same way. As for the determination of the animation image itself, there are four possible means which may be considered. The first configuration involves the manual selection of the animation image. The second configuration involves the addition of a music category to the MIDI data header whereby the data is accessed in the terminal and the animation image which matches the specified category is duly selected. The third configuration involves the addition of animation image number data to the header whereby the animation image which corresponds to the specified number is then selected at the terminal. The fourth configuration involves the fully automatic selection of the animation image. The first of these configurations does not require the insertion of any additional data and, since the animation images can be selected with complete freedom, this also provides for the exercise of personal taste. The second configuration enables a degree of matching of the animation images which are reproduced with the mood of the music and this is the configuration most commonly used.

Figure 2:
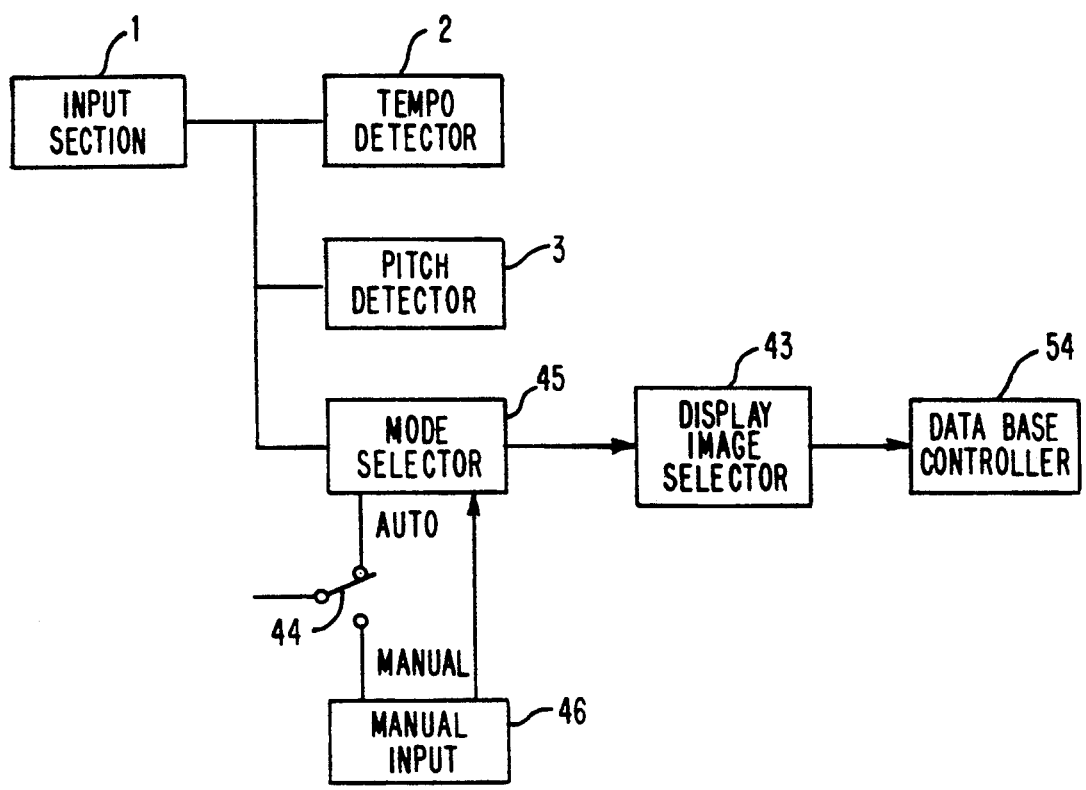
FIG. 2 is a block diagram illustrating one preferred embodiment of the image selector.

Moreover, since in this case the amount of additional data required for the selection of the musical category is only minimal, there is no impairment of the basic advantages of the MIDI standard. The third configuration enables the selection of animation images which have been predetermined from the outset and this has the double advantage of getting the best out of the audiovisual effects while at the same time keeping the amount of additional data required to a minimum. In the fourth configuration the animation images are selected at random by means of the display image selector 43. This has the advantage that no additional data is required. Clearly, therefore, the adoption of the first configuration would require the addition of a manual input device whereas the adoption of any one of the second, third or fourth configurations would permit the use of the block diagram of FIG. 1 without alteration. FIG. 2 is an example of a circuit which enables a selection to be made between the first of the configurations described above, in which the display image selector 43 is controlled manually, and one or other of the second, third and fourth configurations depending on which one has been incorporated into the system. 44 is a mode selection switch which is used to switch between the automatic and manual modes of the mode selector 45. 46 is a manual input device which would typically be configured to enable the numerical input of animation image identification numbers. When switched to automatic mode, on the other hand, the data would be processed by the particular configuration which has been selected from the second, third and fourth configurations above, this selection having been based on the precise structure of the data to be processed.

The image composer 5 is configured from four internal blocks, namely the color gate 51, the image buffer 52, the image gate 53 and the database controller 54. These blocks generate video data in the order described below. First, in response to a signal from the display image selector 43, the database controller 54 loads animation image data from the image database 6 which it then relays to the color gate 51.

The color gate 51 then composes said animation image data with the foreground and background colors specified by the image color signal e and stores the resulting data in the image buffer 52. When the image gate 53 opens in response to the display timing signal c, the data relating to a single frame is transmitted in digital signal form from the image buffer 52 to the image display unit 7. After converting the digital signals of a single frame to video signals, the image display unit 7 outputs a signal to the visual display medium 8 and as a result the first still image is displayed. When the next display timing signal c is output following receipt of the next trigger signal a, the same series of operations are then repeated and the second still image is displayed. The sequential repetition of this same series of operations results in the display of animation images on the visual display medium 8 in a way which closely replicates the display of dynamic images.

Since the tempo data is used in this preferred embodiment as the means for opening the image gate 53, generally speaking a piece of music with a fast tempo will give rise to rapid frame feed whereas the frames will be fed through more slowly in the case of a piece of music with a slow tempo.

The adoption of the preferred embodiment described above in conjunction with a karaoke reproduction device whereby a digital sound source analyzes MIDI data for the generation of audio signals, which are then fed through an amplifier and subsequently reproduced as music, is a known configuration. The MIDI data is, however, read simultaneously from the input section 1. Then, on receipt of some sort of trigger signal, the display image selector 43 selects a sequence of thematic animation images from the image database 6. At the same time, the pitch detector 3 extracts pitch data for the purpose of determining the color of the animation image. Similarly, the tempo detector 2 also simultaneously extracts tempo data and outputs animation image frame feed timing signals to the image gate 53 such that the animation image frames are fed through one by one for display on the visual display medium 8.

Furthermore, the animation image themes are given a loop format such that the display of a sequence of animation images can be started at any point in the development of a theme without imparting a sense of unnaturalness to the viewer. This removes the need for specification of a start screen address and this in turn enables the creation of a simpler program from the data processing point of view.

What is claimed is:

1. An animation image composition and display device, used in conjunction with a karaoke device which drives a digital sound source by means of MIDI data for the reproduction of music, said animation image composition and display device comprising:
   a tempo detector which identifies tempo data from said MIDI data and which generates a sequence of pulses which are synchronized with the tempo at which the music is reproduced;
   a pitch detector which identifies pitch data from said MIDI data and which outputs said pitch data in sequence; and
   an image composition controller comprising a display timing calculator, which outputs trigger signals in accordance with the timing of said pulses, a display color calculator, which processes said pitch data in order to determine the foreground and background colors, and a display image selector, which outputs a control signal to a database controller which selects one or more items of animation data from an image database in which are stored a plurality of sets of animation images in data form;
   said animation image composition and display device also being used to arrange said selected items of animation data and said determined colors and to display still images on a visual display medium one frame at a time by way of an image gate which opens in response to said trigger signals.

2. The animation image composition and display device according to claim 1 which comprises a manual input device as means for selecting animation data, and which determines specific animation images in accordance with input of symbols corresponding to each individual set of animation images respectively to a display image selector.

3. The animation image composition and display device according to claim 1 which determines specified animation images in accordance with codes processed as required from pitch data as means for selecting color data.

4. The animation image composition and display device according to claim 1 which incorporates a selector switch for switching between manual mode and automatic mode as means for selecting animation data.

5. The animation image composition and display device according to claim 1 which makes use of an optical disk device as an image database.

6. The animation image composition and display device according to claim 1 which uses a monitor screen as a visual display medium.

7. The animation image composition and display device according to claim 1 which incorporates a MIDI decoder for conversion of serial MIDI data in the input area of the tempo selector and the pitch selector to N bits of parallel MIDI data.

* * * * *